Figure 1:
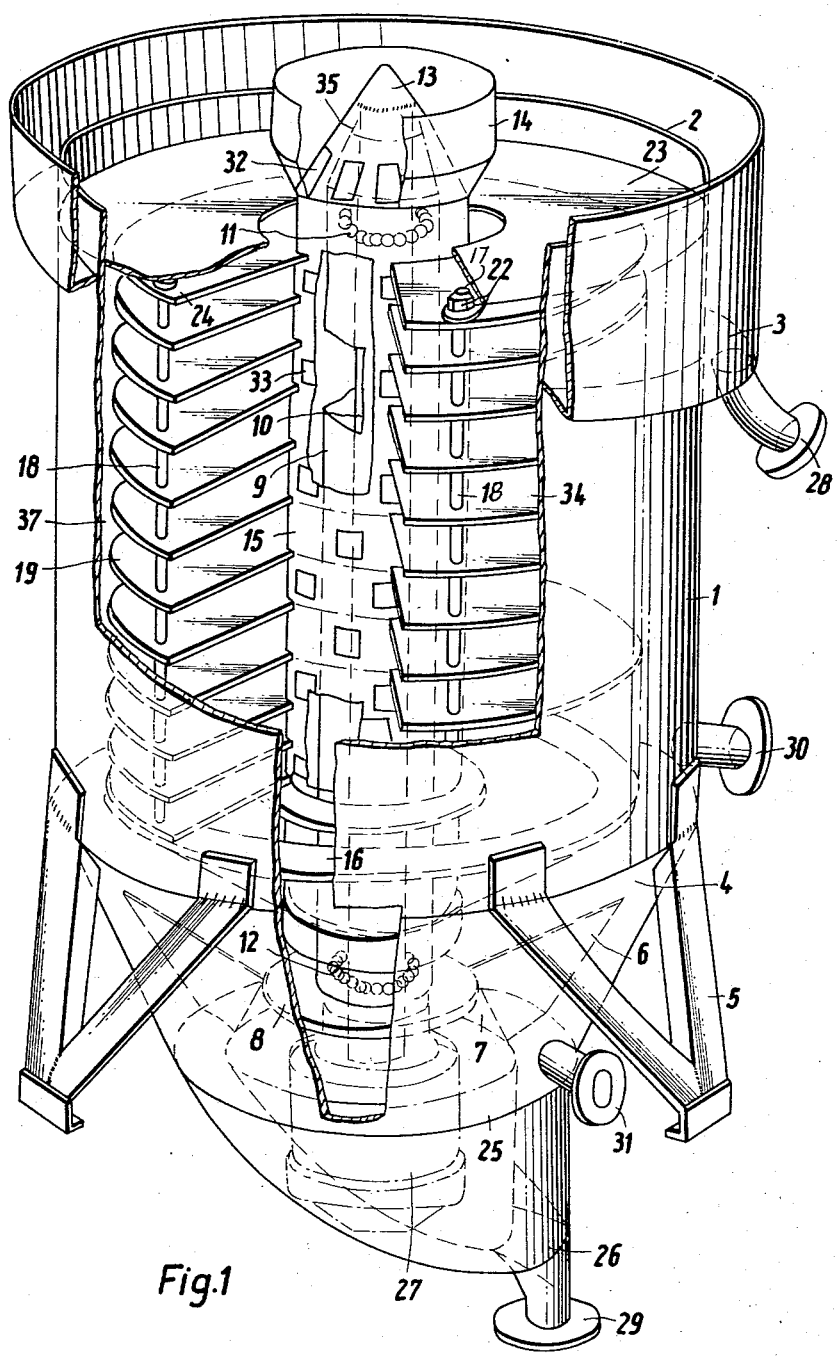

Feb. 27, 1968  H. F. TRAWINSKI  3,370,714

APPARATUS FOR THE MECHANICAL CLEARING OF SUSPENSIONS

Filed Dec. 31, 1964  5 Sheets-Sheet 1

Inventor:
HELMUT FRANZ TRAWINSKI

BY Robert H. Jacob
AGT.

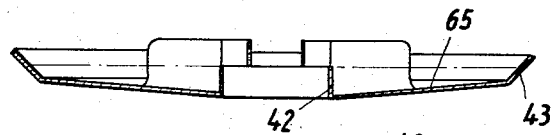
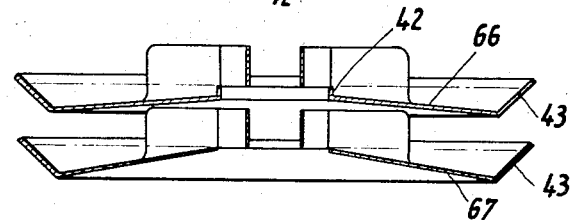
Fig. 7a
Fig. 7b
Fig. 7c

United States Patent Office 3,370,714
Patented Feb. 27, 1968

3,370,714
APPARATUS FOR THE MECHANICAL
CLEARING OF SUSPENSIONS
Helmut Franz Trawinski, Schonbrunner Strasse 21,
Hirschau, Upper Palatinate, Germany
Filed Dec. 31, 1964, Ser. No. 422,756
Claims priority, application Germany, Jan. 4, 1964,
A 44,930
12 Claims. (Cl. 210—519)

The present invention relates to the mechanical clearing of suspensions which contain solids that are separable by sedimentation. More in particular, the invention deals with measures and means for the removal of the deposited solids.

The efficiency of such an apparatus increases as the effective clarification surface increases which is the sum of all built in depositing surfaces. However, this concerns merely the projection onto the horizontal surface, since is such devices the solids settle out of the liquid only by gravitational force.

In this connection centrifuges are known in which the separation of the solids from the liquid is effected by a considerable increase in the centrifuging action. This involves shortcomings such as a large amount of power consumption for the casting and expensive or complicated, as well as heavy, construction necessitated by the high number of revolutions. Besides, the relatively fine grains or particles of the polids cast out can be damaged by these great centrifugal accelerations. This can be a disadvantage if the solids are for further use, for example, if they are the desired end product. As compared to this, the invention relates primarily to the sedimentation clearing devices, while avoiding these shortcomings.

This involves primarily the requirement that the surfaces can be cleaned immaculately and readily of the solids deposited thereon, for example, sludge or silt. The manual cleaning by brushes or scrapers which was conventional heretofore is in certain respects insufficient. Besides, the effective clarification surface is to be increased without it becoming necessary to increase the dimensions of the container proportionately.

It is an object of the invention to solve the aforementioned problems as well as further problems of clarification apparatuses of this type. It is proposed in accordance with the invention to periodically or arbitrarily cast off by rotation of the surfaces the solids deposited on the surfaces. This casting or centrifuging is only of short duration. On the other hand the surfaces are at a standstill during the actual working cycle during which the solids settle themselves out of the liquid by virtue of their own natural weight. The removal of the solids from the surfaces by rotation advantageously requires only very low numbers of rotation because the centrifugal acceleration of the order of 1 g, preferably even less than 1 g (1 g=ground acceleration) obtains immaculate cleaning.

Since it is no longer necessary now to introduce brushes or scapers between the surfaces, the surfaces may be arranged very closely above one another. Therefore, it is possible to accommodate a very large number of surfaces in a container of relatively small structural height. In accordance with further proposals the surfaces may be disposed horizontally or inclined, for example, in the form of shells.

The cleaning of the surfaces can be effected at random at any desired time or periodically at definite time intervals, for example, by means of a switching clock, without it being necessary to open the container for the purpose. The casting off of the settled solids may take place with the container filled. This is especially possible when the solid substances are heavy. It is also possible to drain the liquid in the container prior to casting or centrifuging, which is recommended in connection with particularly sensitive solids that can be easily dispersed.

In addition to the interrupted cleaning of the surfaces it is also possible to provide for continuous flowing off of the solids.

The invention can be used, for example, for obtaining an end product that is constituted by a solution. This occurs particularly in the chemical industry. As a further field of utilization the removal of dirt substances such as sludge or silt may be mentioned. This includes primarily the purification of water, as drinking water, waste water, as well as water in plants of industry which is used to carry off impurities, etc.

Figure 2:
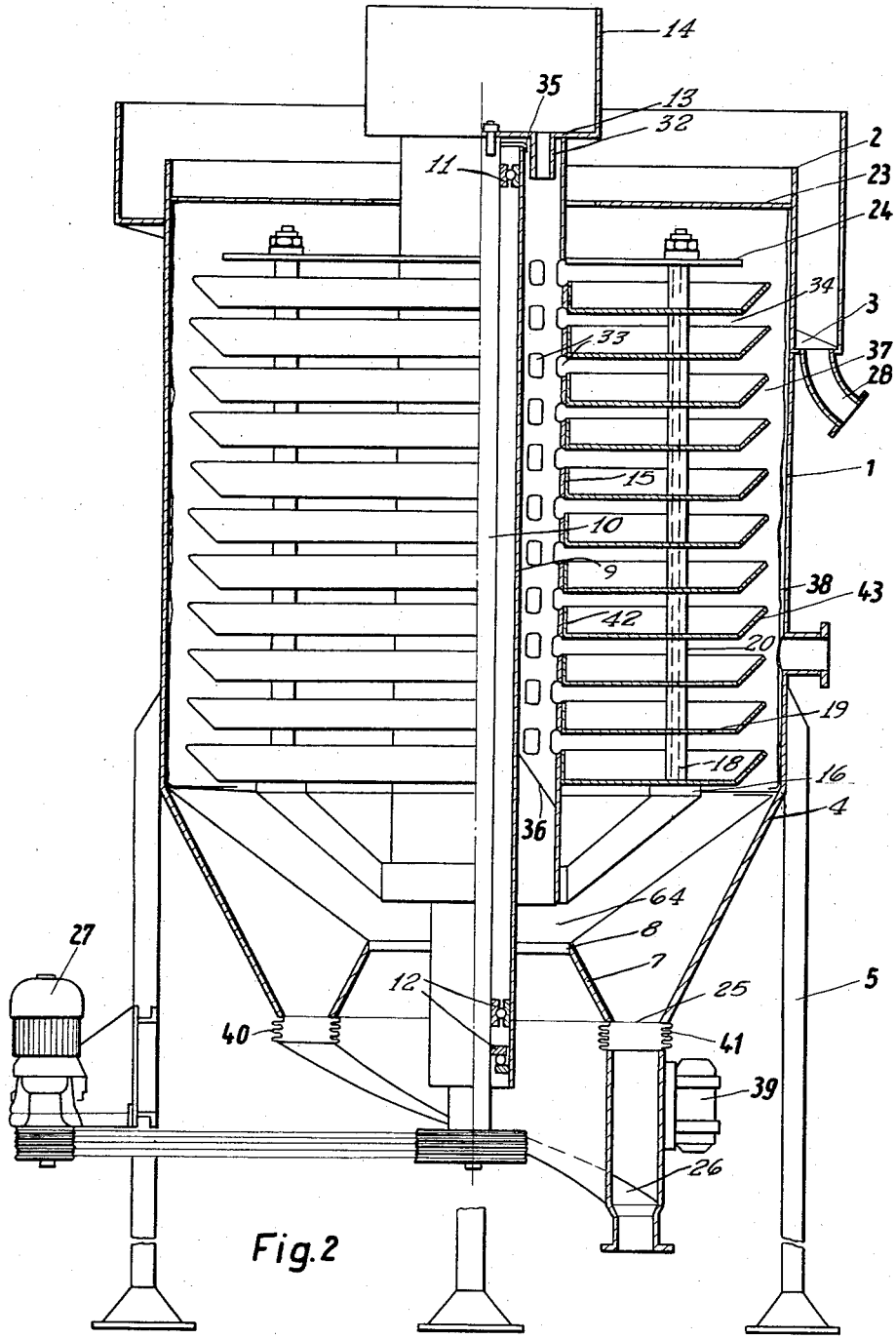
Figure 3:
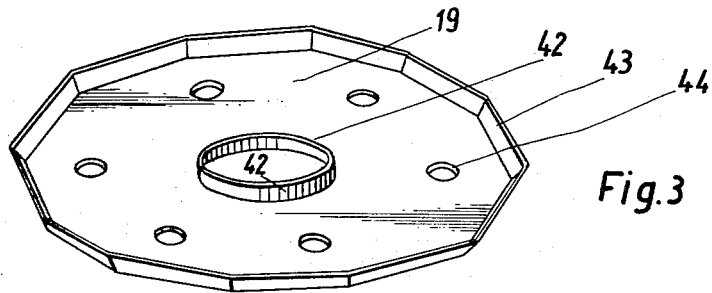
Figure 3A:
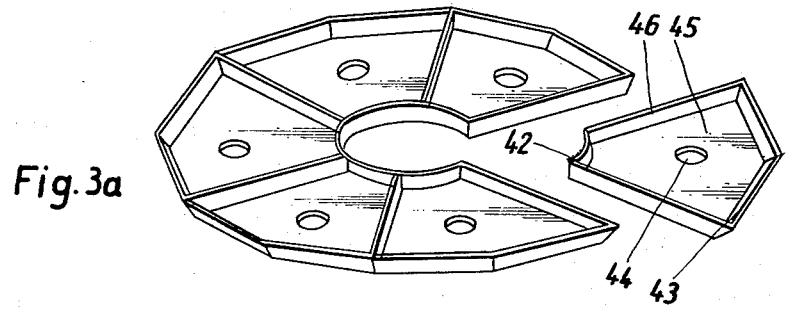
Figure 4:
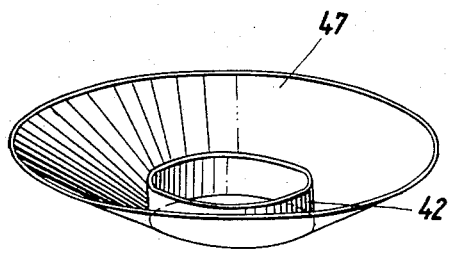
Figure 5:
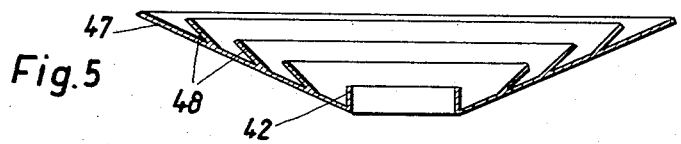
Figure 6:

The invention is concerned with apparatus described hereinafter with reference to the embodiments illustrated in the accompanying drawings without being limited thereto, and in which FIG. 1 shows a first embodiment of the invention in perspective view, partly in section, FIG. 2 shows a further embodiment in two different sections, FIG. 3 shows a perspective view of one embodiment of a settling surface plate or element, FIG. 3a shows a perspective view, partly in section, of another embodiment of a settling surface plate or element, FIGS. 4, 5 and 6 illustrates further configurations of settling surface plates or elements, FIGS. 7a, b and c show further embodiments of settling surface plates adapted for the continuous flow off of the solids, and FIG. 8, an embodiment of a two-stage arrangement in accordance with the invention.

The description of FIG. 1 which follows pertains generally also to the embodiment in accordance with FIG. 2. The cylindrical container or vat 1 with its circular weir 2, an overflow channel 3 and a double-cone bottom portion 4, 7 is supported by legs 5. A carrier plate 8 is built into the inner cone 7 which firmly supports the bearing shell 9. The shaft 10 is journalled in this shell and is driven by the motor 27 directly or by way of a belt drive. The shaft 10 with its bearings 11 and 12 is properly shieled or isolated by the shell 9 against the suspension in the container or vat 1. This is of particular importance for the lower bearing 12.

The drive shaft 10 is connected for rotary movement to the central tubular current distributor 15 by way of a stationary connecting member 13, which carries also the intake or supply vessel 14. Thus the distributor 15 is carried together with the stack of plates or elements by the upper end of the shaft 10 and concentrically encompasses the parts 9, 10. At its lower end the distributor 15 has a spoke ring or star carrier element 16 with which connecting bars 18 may be threadedly connected. The number of the sediment plates or elements 19 which constitute the stack depends on the length of the spacing sleeves 20. In the drawings 12 or 11 plates or elements are shown. In actual practice as many as 50 or more such elements may be provided. The stack is held in assembled condition by the bars 18 which may be placed under tension with the plates or elements 19 by nuts 22. An upper sediment surface plate 24 may be of greater thickness than the others and connected for rotation with the distributor tube 15 by means of catches, pegs or pawls (not shown). A deflection plate 23 is connected with the container or tank 1. The inner space of the bearing shell 9 is shielded against spray water by a metal plate 35 or the like, while a further metal plate or baffle 36 shields the sludge or silt colecting space which is below the distributor or carrier tube 15 against the entrance of fresh suspension liquid.

The turbid or suspension solution is continuously fed to the supply vessel 14 and enters the annular space through the apertures 32 which is defined between the components 9 and 15. The liquid flows out of this annular space by way of the apertures 33 of the distributor tube evenly and in radial direction into the spaces 34 which are between the surfaces of plates or elements 19.

During the time that the solid substance such as sludge is deposited on the surfaces of the plates or elements 19 the partial clear flow streams unite in the annular space 37 between the stack of plates or elements and the container 1. Between the top or cover plate 24 and the deflection plate 23 the combined clear flow finally flows over the annular weir into the overflow channel 3 and is there continuously discharged through the tubular stub 28. The removal of the deposited solids from the surfaces takes place in accordance with the invention by rotating the sediment plate or element stack by means of the drive and force transmission means described above. This can be effected periodically or at random, for example, after a certain critical thickness of the layers has been reached. After being cast off from the surfaces of the plates or elements 19 the solids arrive in the annular space 37 between the outer and inner cones 4 and 7, and after passing through the annular slot 25 they are conductive by way of an offset portion 26 to the discharge stub 29. The offset 26 is formed by two helically shaped parts in the form of half shells. The liquid suspension in the container can be discharged through the discharge stubs 30 and 31. This is necessary in the case of repairs or in cases where a readily dispersible solid material cannot be centrifuged out within the suspension.

The surfaces of the plates or elements 19 which are closed at the bottom and can be of various shapes and may be unitary annular pans or composed of several pan segments.

Thus FIG. 1 illustrates plane annular discs 19. The surfaces, however, may also be in the form of shells. If these shells are open toward the top (see, for example, FIG. 2), they constitute a collecting space in which a predetermined quantity of the solids can be deposited. In spite of this the solids are properly cast off outwardly over the border of the shell when the stack of pans is rotated. In the example of FIGS. 2, 3 and 3a the surfaces extend horizontally and are provided with inner and outer borders 42, 43 with the outer borders preferably inclined.

In order to simplify the manufacture the borders of the pans or parts forming them can be formed with borders all around (FIGS. 3, 3a). The parts or sectors 45 (FIG. 3a) may, in addition, be provided with radially extending side borders 46, thus forming a pan that is sealed against sludge. Preferably the number of the sectors per layer may equal the number of the connecting bars in the stack so that each sector 45 has an aperture 44 for the passage of the bar or rod 18.

As shown in FIG. 4 the surface 47 may also be conical without an outer border. If it is desired in the case of greater inclination of the surface 47 to have the inner border 42 low and thus provide for a smaller space between the shells, it is possible by means of conical intermediate border rings 48 (FIG. 5) to collect a relatively larger quantity of solids. In the embodiment in accordance with FIG. 6 the collecting surface 49 declines slightly outwardly and is merely provided with the inclined outer border 43.

The surface elements or parts in accordance with the foregoing embodiments may also be of conical shape. Thus FIG. 7a shows a saucer shaped surface 65 which is conically inclined outwardly with a cylindrical inner border 42 and a conical outer border 43. In accordance with FIG. 7b the inner surface 66 is inclined outwardly. The inclination of the similar surface 67 in FIG. 7c is such that no inner border is required. The dot and dash lines indicate the optimum height of the upper surfaces of the solids as required by the inner border 42.

If remixing of already deposited fine solids with the suspension might be expected (this may be the case above all in the event of a smaller difference of specific gravity between the solids and the carrier liquid), clearing in two stages is recommended. For this purpose the stack of plates in accordance with FIG. 8 may be divided into two sets or groups disposed in series relationship.

The supply of the suspension may take place in one of the ways described. In the embodiment in accordance with FIG. 8 a tube 15 is provided for this purpose which, however, is only provided with apertures 33 in the range of the elements 19 of the lower group. From there the precleared suspension is diverted inwardly by way of a separating disk or plate 71, as indicated by the arrows on the left side of FIG. 8. The liquid enters an annular space 72 between the exterior of the tube 15, which is not perforated in this area, and the inside of an additional perforated tube 73, and after that through the apertures 74 thereof into the spaces between the elements 75 and the upper group of the stack of elements. The connecting rods 18 hold the entire stack together. The lowest surface 76 of the upper part of the stack is rigidly connected with a cylinder 77 which rotates with the plates and which encompasses the elements of the lower stack.

The connection between the surface element 76 and the cylinder 77 may be of conical configuration as shown in the drawing. This arrangement insures that on the one hand the cleared liquid of the lower group can flow along the inner wall of the cylinder upwardly, while between the inner wall of the container and the outer wall of the cylinder there remains sufficient space for the discharge of the solids of the upper group.

Figure 8:
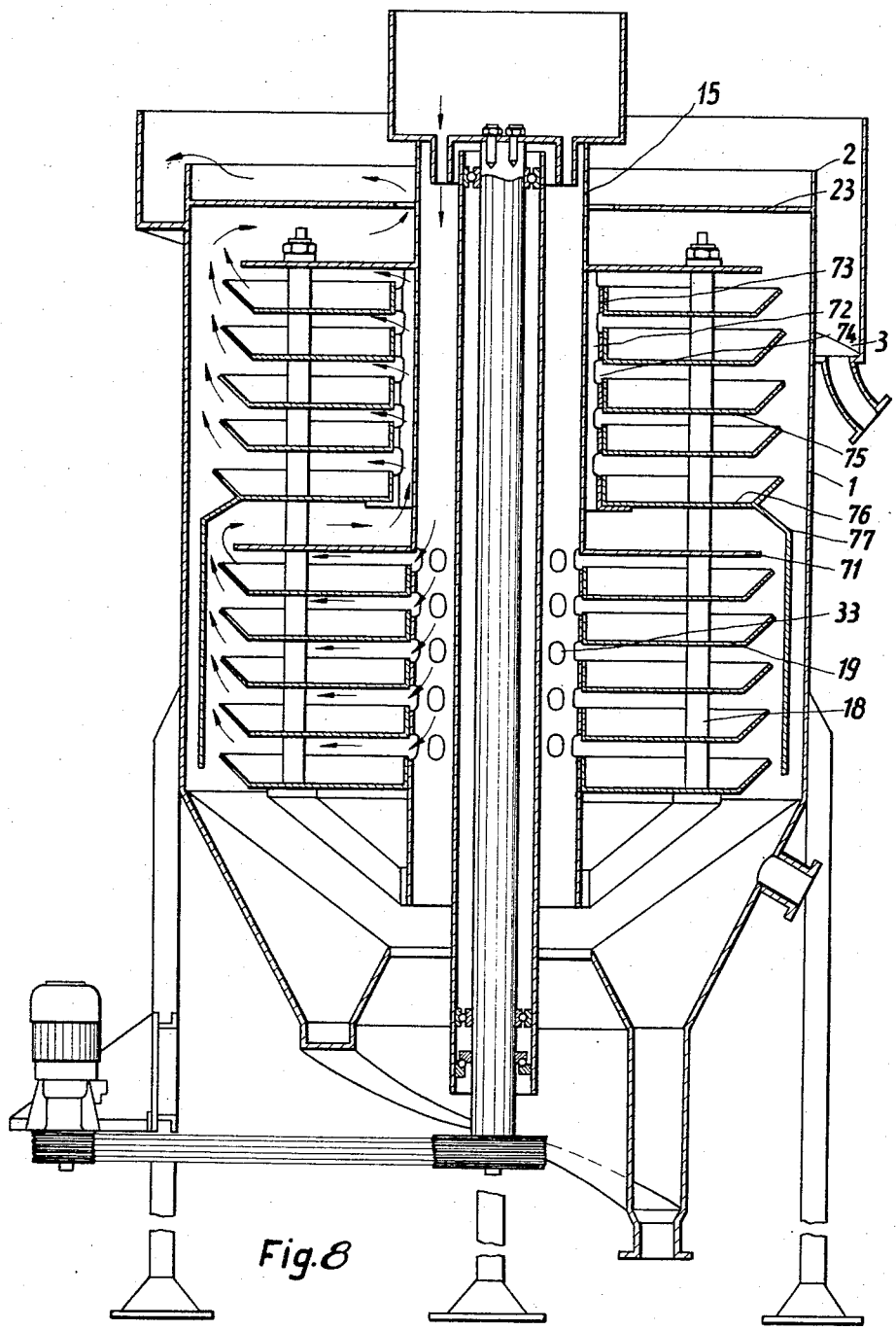

As to the remaining features the embodiment in accordance with FIG. 8 corresponds to that in accordance with FIG. 2, so that further details are not designated in FIG. 8.

The solids cast off are damp in any event. Their consistency, however, differs depending on the particular conditions. Under unfavorable circumstances there is a danger that they hang or remain stuck on the surfaces of the plates on the inner wall of the container and on the helical extension. In order to prevent this the following additional means may be provided: The entire stack of elements can be made to oscillate at a suitable frequency and amplitude in the event that the solids are not carried off during centrifuging with sufficient speed. The oscillation generator necessary for this purpose is not illustrated. It may be provided at the distributor or carrier tube 15, on the structural component 13 or also on the supply vessel 14 connected thereto above the surface of the liquid. By means of this vibrating device the solids may also be condensed prior to the centrifuging.

In order to avoid adhesion of the cast off solids on the inner wall of the container 1, a cylindrical fabric or apron 38 may be provided in the annular space 37. This fabric is preferably made of artificial fibers and suspended from the diverting disk 23. For cleaning purposes it is lifted out together with the diverting disk 23, or the diverting disk 23 can also be provided with a shaking means (not illustrated) so that the apron 38 is caused to vibrate within the container and thus is cleaned. Depending on the type of solids, the shaking may be effected below the level of the liquid or also with the container in empty condition.

The stagnating of the solids in the extension 26 can be prevented by means of a further vibrating means 39. For this purpose the double wall extension 26 may be connected in a water tight manner with the outer cone 4 and the inner cone 7 by elastic intermediate members 40, 41 which preferably are of rubber or plastic (see FIG. 2).

In certain cases the vibrations referred to above may also be derived from a common oscillation generator.

Having now described my invention with reference to the embodiments illustrated in the drawings, I do not wish to be limited thereto, but what I desire to protect by Letters Patent of the United States is set forh in the appended claims.

I claim:

1. Apparatus for removing solids from suspensions by allowing the solids to settle on surfaces and after settling casting them off by centrifugal action, said apparatus comprising a container, a stack of elements in the form of open top and closed bottom collection pans presenting sedimentation surfaces for solids and mounted for rotation in said container, and drive means for rotating said elements, said drive means comprising a shaft arranged vertically in said container, a carrier and distributor tube supported on and rotatable with said shaft, a stationary sleeve rigidly supported on said container and bearing means mounted on said sleeve and supporting said shaft for rotation, said sleeve extending intermediate said shaft and said carrier tube and being spaced from said shaft and said carrier tube and shielding said shaft and said bearing means against the suspension.

2. Apparatus in accordance with claim 1 wherein said shaft projects above the upper end of said stationary sleeve and supports said carrier tube at its upper end for rotation with said shaft, and said carrier tube supports said elements at their radially inner ends.

3. Apparatus in accordance with claim 2, wherein said carrier tube defines an annular space around said stationary sleeve constituting an intake for the suspension and having a plurality of apertures disposed in flow relation to said elements and directs the flow of the suspension radially outwardly, and the outer peripheries of said elements together with the wall of said container define a further annular space defining an upwardly extending path of flow for the cleared liquid and a downwardly extending path for the discharge of separated solids.

4. Apparatus in accordance with claim 1, wherein at least the outer periphery of said elements is provided with an upwardly extending border.

5. Apparatus in accordance with claim 1, wherein said elements present conical surfaces and are provided with an upwardly extending border.

6. Apparatus in accordance with claim 1, wherein said elements are in the form of segments.

7. Apparatus in accordance with claim 1, wherein said elements are segments having radially extending sides and are joined at said radially extending sides, and having outer and inner borders disposed at an angle relative to the surface of said elements and provided with upwardly extending borders along said radially extending sides.

8. Apparatus in accordance with claim 1, wherein said elements are segments having radially extending sides and having borders along the peripheries thereof to define pans.

9. Apparatus in accordance with claim 2 wherein two groups of surface elements are arranged in stacks, one above the other, where the carrier tube is provided with apertures to first feed liquid suspension to one stack of elements, and channel means comprising an additional carrier and distributor tube are provided to conduct the flow from the one stack over the outer border of the elements thereof to the inner ends of the elements of the other stack and where said additional carrier tube is provided with apertures proximate the elements of said other stack.

10. Apparatus in accordance with claim 2, wherein said carrier tube constitutes the intake and feed tube for the suspension and wherein said elements are arranged in two groups of stacks, an upper group and a lower group, a separating and flow conducting means being disposed intermediate said lower and said upper group, said carrier tube having intake apertures adjacent the elements of said lower group, the elements of said upper group being supported at the inner ends thereof at a distance from said carrier tube to define a channel for upward flow, said upper group of elements conducting the flow upwardly and outwardly, and where a discharge channel is provided at the upper end of said container to discharge the cleared liquid upwardly and outwardly from said upper group of elements.

11. Apparatus in accordance with claim 2, wherein said container is provided at the lower end thereof with downwardly extending conical baffles defining an annular channel therebetween for collecting and conducting the solids and a discharge means is connected to said channel.

12. Apparatus in accordance with claim 2, wherein an apron of fabric or the like is suspended in said container adjacent and extending along the inner wall thereof.

References Cited

UNITED STATES PATENTS

| | | | |
|---|---|---|---|
| 1,231,409 | 6/1917 | Moore | 210—84 X |
| 1,718,871 | 6/1929 | Nordell | 210—84 X |
| 1,940,794 | 12/1933 | Fisher | 210—522 |
| 2,253,543 | 8/1941 | Weber et al. | 210—521 X |
| 3,052,359 | 9/1962 | Rounds | 210—521 X |
| 3,197,336 | 7/1965 | Diaz-Compain | 210—522 X |

SAMIH N. ZAHARNA, *Primary Examiner.*

REUBEN FRIEDMAN, *Examiner.*

D. RIESS, J. ADEE, *Assistant Examiners.*